No. 729,734. PATENTED JUNE 2, 1903.
F. E. CASE.
BRAKING SYSTEM.
APPLICATION FILED FEB. 18, 1901.
NO MODEL. 2 SHEETS—SHEET 1.
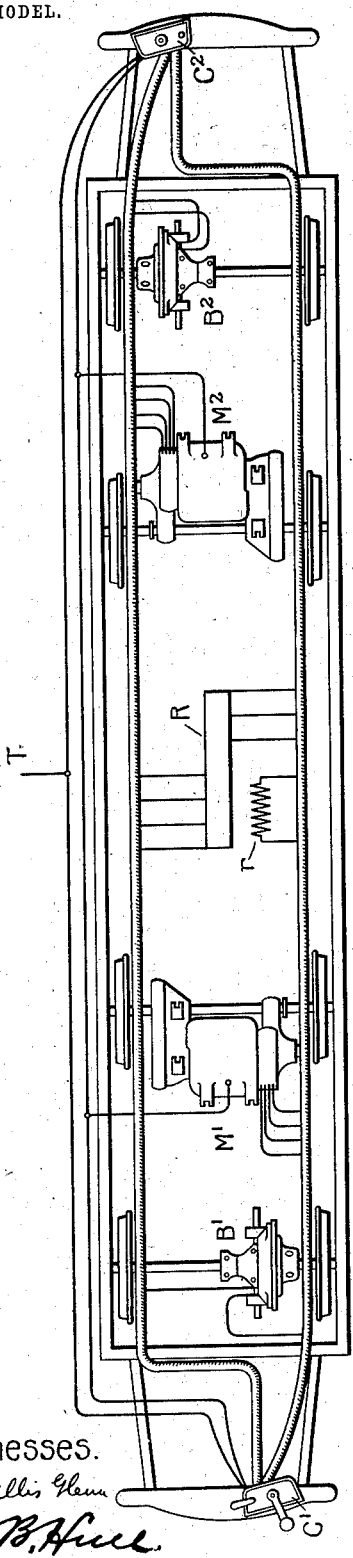
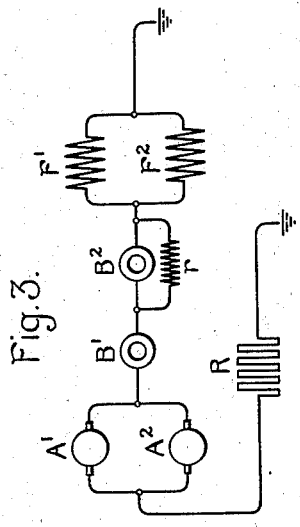
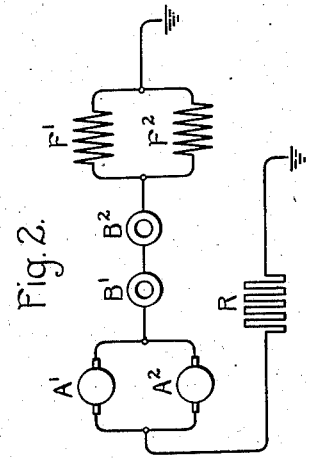
Witnesses.
Inventor.
Frank E. Case,
by Albert G. Davis.
Atty.

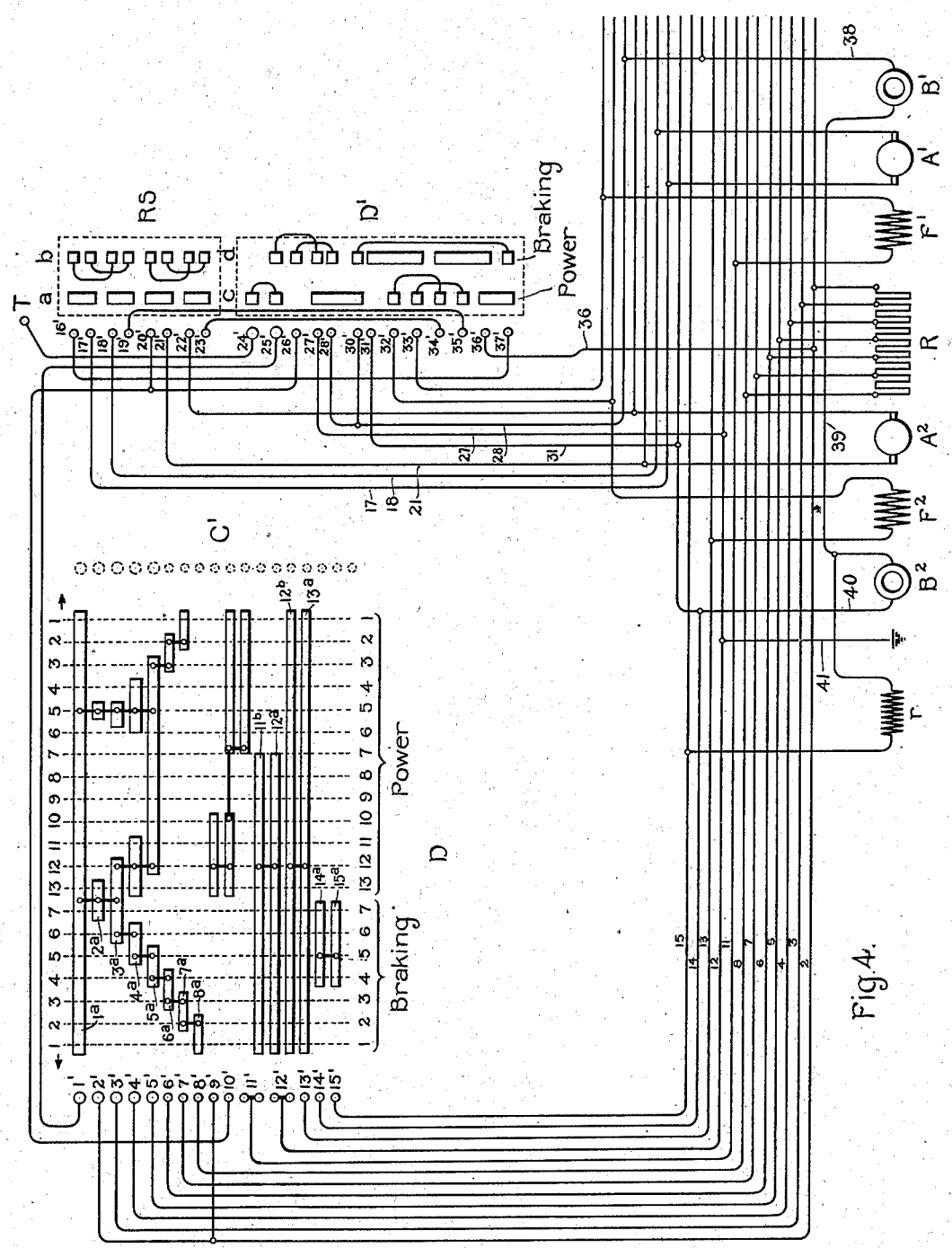

No. 729,734. Patented June 2, 1903.

UNITED STATES PATENT OFFICE.

FRANK E. CASE, OF SCHENECTADY, NEW YORK, ASSIGNOR TO GENERAL ELECTRIC COMPANY, A CORPORATION OF NEW YORK.

BRAKING SYSTEM.

SPECIFICATION forming part of Letters Patent No. 729,734, dated June 2, 1903.

Application filed February 18, 1901. Serial No. 47,788. (No model.)

*To all whom it may concern:*

Be it known that I, FRANK E. CASE, a citizen of the United States, residing at Schenectady, county of Schenectady, State of New York, have invented certain new and useful Improvements in Braking Systems, of which the following is a specification.

My present invention relates to braking systems for railway cars or vehicles, especially such as are electrically operated, and has for its object to prevent the skidding of the wheels on the rear axle or truck as the car is being brought to rest.

In any car in which the motion is retarded by an application of brakes to the wheels or axles there is a tendency for the body of the car to surge forward, and, since its center of gravity is above the axle, the tendency is for the body to swing upward on the forward truck or axle as a pivot, thus relieving the rear truck or axle of a considerable portion of the weight which normally rests upon it. If, then, the brakes are applied with sufficient force to give a good braking effect at the forward end of the car, there is danger of skidding the wheels at the rear end, and in the heavy cars now commonly used in electric-railway systems this effect may become very marked if it is attempted to brake at a higher rate of acceleration.

By the operation of my invention it becomes possible to obtain a maximum braking effect on the forward truck or axle without skidding the wheels on the rear axle or truck. I accomplish this result by so arranging the braking system that no matter from which end of the car it is actuated the brakes at the rear will be applied with a force less by a predetermined amount than those at the front.

I have illustrated my invention as applied to a braking system employing electrically-actuated brakes, and in such a system I accomplish the desired result by providing the braking-switch of the controller with auxiliary contacts, which serve in the last few braking positions of the controller (as shown, in the last four positions) to shunt the actuating-winding of the rear brake by a properly-calculated resistance.

My invention will be better understood by reference to the following description, taken in connection with the accompanying drawings, while its scope will be pointed out in the appended claims.

In the accompanying drawings, Figure 1 is a diagram of a car equipped with my improvements. Fig. 2 is an illustrative diagram of the braking connections for the first three braking positions. Fig. 3 is a similar diagram for the last four positions. Fig. 4 is a diagram of the controller-circuits.

The propelling-motors $M'$ and $M^2$ are mounted, respectively, on the front and rear trucks of the car, each motor being geared to one of the axles of its truck. The other axle of each truck carries an electromagnetic brake $B'$ or $B^2$. Besides the motors and the brakes the car is provided with the usual regulating resistances R and with an auxiliary resistance $r$, the function of which will be hereinafter described. Controllers $C'$ and $C^2$, located one at each end of the car, operate to control the motors both when supplied with power from the trolley connection T and when operated as momentum-driven generators to supply current to the brakes $B'$ and $B^2$. The brakes shown in the drawings are of the disk type, having one member surrounding the car-axle and fixed with respect thereto and the other member arranged in proximity thereto and slidingly mounted on the car-axle, but not rotatable thereon.

In Figs. 2 and 3, which are diagrams of the circuits completed by the controllers in the braking positions, $A'$ and $F'$ indicate, respectively, the armature and field-windings of the motor $M'$, and $A^2$ and $F^2$ the corresponding elements of the motor $M^2$. $B'$ and $B^2$ indicate the brakes, whose windings are included in the motor-circuit, and R is a variable resistance included in the motor-circuit and operating to regulate the braking action. The arrangement thus far described is well known in the art and forms no part of my present invention, which consists in connecting a shunt, including a resistance $r$, around that one of the brakes which is mounted at the rear end of the car. The shunt is not closed until the fourth braking-point has been reached by the controller-handle.

It should be noted that the controller $C'$ must be arranged to shunt the brake $B^2$ and the controller $C^2$ to shunt the brake $B'$, each of said brakes being the rear one when the respective controller at the forward end is being operated.

It will of course be understood that the auxiliary controller-contacts may be arranged to shunt the brake-shoe in all the braking positions of the controller instead of in the last four or to cut in the resistance gradually instead of all at once; but I have found that in practice the arrangement which I have illustrated is satisfactory. In the first few braking positions the coefficient of friction between the members of the brake-shoes is low, by reason of the fact that the car is traveling at a high rate of speed, and there is but little danger that the rear wheels will slip until the speed of the car has become somewhat reduced. Hence my improvement is brought in play during the latter part of the braking action only.

In order to render the description more complete, I have illustrated in Fig. 4 a controller properly connected to the motor and brake circuits and provided with the additional contacts necessary for making the connections shown in Fig. 3. In Fig. 4, $A'$ and $A^2$ represent, as before, the motor-armatures, and $F'$ $F^2$ their field-windings. $B'$ and $B^2$ represent the brake-shoes, R the main regulating resistance, and $r$ the auxiliary resistance used for shunting the brakes in the last four braking positions of the controller. $C'$ indicates a controller comprising three cylinders D, $D'$, and RS, carrying movable contact-segments adapted to coöperate with the corresponding fixed fingers $1'$ to $37'$. The contact-segments of the controller-cylinders are shown developed on a plane surface, as is customary in illustrating such structures.

The cylinder RS is the reversing-switch cylinder. It is provided with two sets of movable contacts $a$ and $b$, adapted to engage with fixed contacts $16'$ to $23'$, inclusive, in order to reverse the motors in a manner well known in the art. The cylinder $D'$ carries two sets of contacts $c$ and $d$, corresponding with the fixed contact-fingers $24'$ to $37'$, inclusive. In the power positions of the main controller-cylinder D the contacts $c$ must engage the fingers $24'$ to $37'$, while in the braking positions of the main cylinder the contacts $d$ must engage said fingers. The main cylinder D carries two sets of segments, one for power and one for braking, the latter being numbered $1^a$ to $8^a$, $11^b$ $12^a$ $12^b$ $13^a$ $14^a$ $15^a$ and coöperating with the fingers $1'$ to $8'$, $11'$ to $15'$.

In the type of controller chosen for illustration in this case the cylinders RS and $D'$ are mounted on a common shaft, the cylinder $D'$ being loose thereon. A suitable cam connection is introduced between the main controller-cylinder D and the cylinder $D'$, so that whenever the cylinder D is moved to its first power position the cylinder $D'$ is moved so as to bring the contacts $c$ into engagement with the fixed contacts $24'$ to $37'$, inclusive, where it remains until the controller is moved to its off position, and whenever the cylinder D is moved to its first braking position the cylinder $D'$ is thrown in such a position as will bring the contacts $d$ into engagement with these same contacts, there to remain so long as the cylinder D is in any one of its braking positions. Such a mechanical construction is well known and in common use in controllers, and since it has nothing to do with my present invention I have not deemed it necessary to illustrate such a construction in the present application, it being sufficient for the purposes of my present invention if it be considered that the contacts $d$ of the switch $D'$ are maintained permanently in engagement with corresponding fixed contacts and that the switch D is operated through its braking positions only.

The power connections of the controller are the same as those described in my pending application, Serial No. 22,714, filed July 6, 1900, and as they do not concern the present invention their description here is unnecessary.

In any one of the first three braking positions the circuit is as follows: One end of the active portion of the resistance R is connected to ground through one of the leads 2 to 8, inclusive, the connection for the first braking position being through lead 8, finger $8'$, connected segments $8^a$ to $1^a$, finger $1'$, lead 1, fingers $25'$ $27'$, lead 27, and lead 41. The other end of the resistance is connected by lead 36 and finger $36'$ with fingers $35'$ and $34'$, leading, respectively, through the two armatures $A'$ $A^2$ by circuits easily traced to a common lead 28, which connects with lead 38, running to the brake-shoe $B'$. The shoes are connected in series by a lead 39, and after leaving the shoe $B^2$ the circuit is by lead 40 to lead 31 and finger $31'$ to fingers $32'$ $33'$, where the current divides again to pass through the field-coils $F'$ $F^2$ and thence by leads 13 and 11 to fingers $13'$ $11'$, segments $13^a$ $12^b$ and $11^b$ $12^a$ to finger $12'$ and lead 12 to ground.

In addition to the above circuit connections it will be noted that the lead 39 is connected through a resistance $r$ and the lead 15 to the finger $15'$ of the main switch D and that the lead 40 is connected by a lead 14 to the finger $14'$ of the same switch. In the last four braking positions the fingers $14'$ $15'$ rest upon the connected segments $14^a$ $15^a$, thus connecting the resistance $r$ between the leads 39 and 40 and shunting the brake-shoe $B^2$. When the brakes are operated from the controller at the other end of the car, the brake-shoe $B'$ is shunted in the last four braking positions of the controller $C^2$, the lead 15 being common to both controllers, and the lead 14 in controller $C^2$ being connected with the lead 38 instead of 40. The current from this controller will therefore pass through the brake B² in all its braking positions, but will be shunted around B' when 15 and 14 are connected.

What I claim as new, and desire to secure by Letters Patent of the United States, is—

1. In an electric braking system for a car or vehicle provided with two electrically-actuated brake-shoes, means for shunting one of said shoes during a portion of the braking positions of the controller.

2. In an electric braking system for a car or vehicle provided with two electrically-actuated brake-shoes, means for shunting one of said shoes during the latter portion of the braking.

3. In an electric braking system for a car or vehicle provided with an electrically-actuated brake-shoe at each end of the car, means for shunting the rear brake-shoe during a portion of the braking.

4. The combination with a double-truck electric-railway car having a brake-shoe on each truck, of means for supplying current to actuate said brake-shoes, and means for shunting the shoe on the rear truck during a portion of the braking.

5. The combination with a double-truck electric-railway car, of a brake-shoe on each truck, and means for lessening the holding power of the brake on the rear truck during the latter part of the braking.

6. In an electric braking system for a car or vehicle, electrically-actuated brakes at each end of the car, a controller for supplying current to actuate said brakes, and contacts on the said controller for shunting the actuating-winding of the brake at the rear end of the car.

7. In an electric braking system for a car or vehicle, electrically-actuated brakes at each end of the car, a controlling-switch at each end for supplying current to actuate the said brakes, and contacts on each of said controllers for shunting the actuating-winding of the brake at the other end of the car.

8. In an electric braking system for a car or vehicle, electrically-actuated brakes at each end of the car, and a controller for supplying current to actuate said brakes, the said controller being constructed and arranged to supply a larger current to the actuating-winding of the brake at the front end of the car than to the corresponding winding of the brake at the rear end.

9. An electric braking system for a car or vehicle, comprising electrically-actuated brakes on the forward and rear axles or trucks, a source of current-supply, and a controller for supplying current from said source to said windings in such a manner as to give an increased braking effect on the forward axle or truck.

10. In an electric car or vehicle, provided with one or more propelling-motors and with electrically-actuated brakes at each end of the car, a braking-controller provided with contacts for connecting said motors to act as braking-generators supplying current to the actuating-windings of the brakes, and other contacts for shunting the actuating-winding of the rear brake.

11. In an electric car or vehicle provided with one or more propelling-motors and with electrically-actuated brakes at each end of the car, a braking-controller provided with contacts constructed and arranged to connect the motors to act as braking-generators supplying current to the actuating-windings of the brakes, in such a manner that the actuating-winding of the forward brake will be supplied with a current greater than that supplied to the corresponding winding of the rear brake.

In witness whereof I have hereunto set my hand this 15th day of February, 1901.

FRANK E. CASE.

Witnesses:
BENJAMIN B. HULL,
EDWARD WILLIAMS, Jr.